(12) United States Patent
Que et al.

(10) Patent No.: US 11,946,999 B2
(45) Date of Patent: Apr. 2, 2024

(54) MISMATCHED FREQUENCY MODULATED CONTINUOUS WAVE RADAR SIGNAL

(71) Applicant: Airbus Defence and Space GmbH, Taufkirchen (DE)

(72) Inventors: Russel Que, Hoehenkirchen-Siegertsbrunn (DE); Klaus Kittmann, Kirchseeon (DE); Michael Von Voithenberg, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 712 days.

(21) Appl. No.: 17/057,326

(22) PCT Filed: May 21, 2019

(86) PCT No.: PCT/EP2019/063129
§ 371 (c)(1),
(2) Date: Nov. 20, 2020

(87) PCT Pub. No.: WO2019/224206
PCT Pub. Date: Nov. 28, 2019

(65) Prior Publication Data
US 2021/0190938 A1 Jun. 24, 2021

(30) Foreign Application Priority Data
May 25, 2018 (EP) .................................. 18174364

(51) Int. Cl.
*G01S 13/87* (2006.01)
*G01S 7/00* (2006.01)
(Continued)

(52) U.S. Cl.
CPC ............ *G01S 13/872* (2013.01); *G01S 7/003* (2013.01); *G01S 7/352* (2013.01); *G01S 7/4004* (2013.01); *G01S 7/4056* (2013.01)

(58) Field of Classification Search
CPC ........ G01S 13/872; G01S 7/003; G01S 7/352; G01S 7/4004; G01S 7/4056
See application file for complete search history.

(56) References Cited

U.S. PATENT DOCUMENTS

| 7,940,743 B2 | 5/2011 | Seisenberger et al. |
| 11,329,689 B1 * | 5/2022 | Rodenbeck .............. H04B 1/30 |

(Continued)

OTHER PUBLICATIONS

A. Stelzer, Precise Distance Measurement with Cooperative FMCW Radar Units, IEEE (Year: 2008).*

(Continued)

*Primary Examiner* — Marc Anthony Armand
(74) *Attorney, Agent, or Firm* — Greer, Burns & Crain, Ltd.

(57) ABSTRACT

A radar system for determining a distance to another radar system includes a transceiver. The transceiver transmits a first Frequency Modulated Continuous Wave, FMCW, radar signal. The first FMCW radar signal includes a first sweep profile. The transceiver is receives a second FMCW radar signal. The second FMCW radar signal includes a second sweep profile which differs from the first sweep profile. The radar system further includes a mixer which generates a beat signal based on the first and second FMCW radar signals. The radar system further comprises a deskewing unit which deskews the beat signal by matching the sweep profiles of the first and second FMCW radar signals. Further a method for determining a distance between radar systems, a system for determining a distance between first and second radar systems and a method for determining a distance between first and second radar systems.

16 Claims, 6 Drawing Sheets

(51) Int. Cl.
*G01S 7/35* (2006.01)
*G01S 7/40* (2006.01)

(56) References Cited

U.S. PATENT DOCUMENTS

2016/0047892 A1    2/2016  Franceschini et al.
2022/0365169 A1*  11/2022  Lefevre ................ G01S 7/0235

OTHER PUBLICATIONS

International Search Report; priority document.
European Search Report; priority document.
Stelzer et al., "Precise Distance Measurement with Cooperative FMCW Radar Units" Radio and Wireless Symposium, 2008 IEEE, Jan. 22, 2008, pp. 771-774.
Anghel et al., Short-Range Wideband FMCW Radar for Millimetric Displacement Measurements: IEEE Transactions on Geoscience and Remote Sensing, Sep. 1, 2014, pp. 5633-5642.
K. Peek, "Estimation and compensation of Frequency Sweep Non-linearity in FMCW Radar" Master of Science in Applied Mathematics Thesis, para. 3.3 on p. 27.

* cited by examiner

//MISMATCHED FREQUENCY MODULATED CONTINUOUS WAVE RADAR SIGNAL

CROSS-REFERENCES TO RELATED APPLICATIONS

This application claims the benefit of the International Application No. PCT/EP2019/063129, filed on May 21, 2019, and of the European patent application No. 18174364.2 filed on May 25, 2018, the entire disclosures of which are incorporated herein by way of reference.

FIELD OF THE INVENTION

Examples relate to concepts for determining a distance between radar systems and applications thereof and, in particular, to a radar system for determining a distance to another radar system, a method for determining a distance between radar systems, a system for determining a distance between a first radar system and a second radar system and a method for determining a distance between a first radar system and a second radar system.

BACKGROUND OF THE INVENTION

Distance measuring systems, such as radar systems, may have to be optimized with respect to spoofing resiliency. Nevertheless, it is desired to form a system for determining a distance between radar systems.

There may be a demand to provide concepts for determining a distance between radar systems.

SUMMARY OF THE INVENTION

According to a first aspect, a radar system for determining a distance to another radar system is provided. The radar system comprises a transceiver. The transceiver is adapted (configured) to transmit a first Frequency Modulated Continuous Wave, FMCW, radar signal. The first FMCW radar signal comprises a first sweep profile. The transceiver is further adapted to receive a second FMCW radar signal. The second FMCW radar signal comprises a second sweep profile. The first sweep profile of the first FMCW radar signal differs from the second sweep profile of the second FMCW radar signal. The radar system further comprises a mixer. The mixer is adapted to generate a beat signal based on the first FMCW radar signal and the second FMCW radar signal. The radar system further comprises a deskewing unit. The deskewing unit is adapted to deskew the beat signal by matching the sweep profile of the first FMCW radar signal with the sweep profile of the second FMCW radar signal.

Thus, a mismatched FMCW radar signal may provide a basis to determine a distance between radar systems.

The beat signal may be generated by the first FMCW radar signal and the second FMCW radar signal. The beat signal may be generated by demodulating the second FMCW radar signal under use of the first FMCW radar signal.

For example, the radar system comprises a signal generator adapted to generate the first FMCW radar signal. The signal generator may be adapted to provide the generated first FMCW radar signal to the transceiver and the mixer.

The provision of the first FMCW radar signal may be performed simultaneously. The provision of the FMCW radar signal may be performed on separate signal lines to the transceiver and the mixer.

For example, the sweep profile of the first FMCW radar signal is linear. For example, the sweep profile of the second FMCW radar signal is linear. Further, the sweep profile of the first FMCW radar signal may have a triangular shape. For example, the sweep profile of the second FMCW radar signal has a triangular shape. Further, the sweep profile of the first FMCW radar signal may have a different time offset than the sweep profile of the second FMCW radar signal. Further, the sweep profile of the first FMCW radar signal may have a different frequency offset than the sweep profile of the second FMCW radar signal.

The sweep profile of the first FMCW radar signal may vary from pulse to pulse. The sweep profile of the second FMCW radar signal may vary from pulse to pulse.

The sweep profile of the first FMCW radar signal may vary from measurement slot to measurement slot. The sweep profile of the second FMCW radar signal may vary from measurement slot to measurement slot.

The mixer may be arranged downstream to the transceiver. The mixer may be arranged downstream to the signal generator.

The signal generator may be arranged upstream of the transceiver. The signal generator may be arranged upstream to the mixer.

For example, the radar system may comprise an analog-to-digital converter (ADC). The ADC may be arranged downstream the mixer. The ADC may be adapted to digitize the beat signal. The step of deskewing may be performed on the digitized beat signal.

The radar system may further comprise a controller. The controller may be adapted to provide a first control signal to the signal generator. The first control signal may comprise information on characteristics of the first FMCW radar signals, such as sweep profile, time offset and/or frequency offset of the first FMCW radar signal.

The controller may further be adapted to provide a second control signal to the ADC. The second control signal provides information on a change in a sampling rate to be used by the ADC.

The radar system may further comprise a processing unit. The processing unit may be adapted to determine a distance (to the other radar system) by processing the deskewed beat signal.

The step of determining the distance may be performed per measurement slot. The step of determining the distance may be performed per pulse.

The processing unit may be arranged downstream to the deskewing unit. The controller may be adapted to provide a third control signal to the processing unit. The processing unit may be in communication with the controller. The controller may be adapted to act as an interface for providing the determined distance from the processing unit via the controller.

The radar system may further comprise a wired data interface. The wired data interface may be adapted to provide a local positioning system with information on the determined distance.

The radar system may be mountable on a flying object, such as an aircraft, helicopter or a drone. The radar system may be mountable on a platform, such as a landing platform. The radar system may be used in combination with another such radar system or multiple such radar systems to provide for a precise position.

The wired data interface may be in communication with the controller. The wired data interface may be adapted to receive the determined distance. The wired data interface may be adapted to provide a command signal to the controller. The command signal may form a basis for the first control signal. The command signal may form a basis for the second control signal. The command signal may form a basis for the third control signal.

The radar system may be monostatic.

The first and second FMCW radar signals may have different triangular sweep profiles.

The first FMCW radar signal may vary from pulse to pulse. The first FMCW radar signal may vary from a measurement slot to a next measurement slot.

According to a second aspect, a method for determining a distance between radar systems is provided. The method comprises transmitting, by a transceiver, a first Frequency Modulated Continuous Wave, FMCW, radar signal. The FMCW radar signal comprises a first sweep profile. The method further comprises receiving, by the transceiver, a second FMCW radar signal. The second FMCW radar signal comprises a second sweep profile. The sweep profile of the first FMCW radar signal differs from a sweep profile of the second FMCW radar signal. The method further comprises generating, by a mixer, a beat signal by based on the first FMCW radar signal and the second FMCW radar signal. The method further comprises deskewing, by a deskewing unit, the beat signal by matching the sweep profile of the first FMCW radar signal with the sweep profile of the second FMCW radar signal.

For example, the step of deskewing may further comprise adjusting a frequency hub of the beat signal according to the sweep profile of the first FMCW radar signal. For example, the step of deskewing may further comprise adjusting a time offset of the beat signal according to the sweep profile of the first FMCW radar signal. For example, the step of deskewing may further comprise adjusting a frequency offset of the beat signal according to the sweep profile of the first FMCW radar signal. For example, the step of deskewing may further comprise adjusting a ramp profile of the beat signal according to the sweep profile of the first FMCW radar signal.

According to a third aspect, a system for determining a distance between a first radar system and a second radar system is provided. The system comprises a first radar system and a second radar system. The first radar system comprises a first transceiver, a first mixer and a first deskewing unit. The system comprises a second radar system. The second radar system comprises a second transceiver, a second mixer and a second deskewing unit. The first transceiver is adapted to transmit a first Frequency Modulated Continuous Wave, FMCW, radar signal. The first FMCW radar signal comprises a first sweep profile. The second transceiver is adapted to transmit a second FMCW radar signal. The second FMCW radar signal comprises a second sweep profile. The first and second sweep profiles are different. The first transceiver is adapted to receive the second FMCW radar signal. The second transceiver is adapted to receive the first FMCW radar signal. The first mixer is adapted to generate a first beat signal based on the first FMCW radar signal and the second FMCW radar signal. The second mixer is adapted to generate a second beat signal by demodulating the first FMCW radar signal under use of the second FMCW radar signal. The first deskewing unit is adapted to deskew the first beat signal by matching the sweep profile of the second FMCW radar signal with the sweep profile of the first FMCW radar signal. The second deskewing unit is adapted to deskew the second beat signal by matching the sweep profile of the first FMCW radar signal with the sweep profile of the second FMCW radar signal.

The first/second radar system may be mountable on a flying object, such as an aircraft, helicopter or a drone. The second/first radar system may be mountable on a platform, such as a landing platform. The first radar system may be used in combination with another first radar system or multiple first radar systems to provide for a precise position. The second radar system may be used in combination with another second radar system or multiple second radar systems to provide for a precise position.

According to a fourth aspect, a method for determining a distance between a first radar system and a second radar system is provided. The method comprises transmitting, by a first transceiver of the first radar system, a first Frequency Modulated Continuous Wave, FMCW, radar signal. The first FMCW radar signal comprises a first sweep profile. The method comprises transmitting, by a second transceiver of the second radar system, a second FMCW radar signal. The second FMCW radar signal comprises a second sweep profile. The first and second sweep profiles are different. The method comprises receiving, by the first transceiver of the first radar system, the second FMCW radar signal. The method comprises receiving, by the second transceiver of the second radar system, the first FMCW radar signal. The method comprises generating, by a first mixer of the first radar system, a first beat signal based on the first FMCW radar signal and the second FMCW radar signal. The method comprises generating, by a second mixer of the second radar system, a second beat signal by demodulating the first FMCW radar signal under use of the second FMCW radar signal. The method comprises deskewing, by a first deskewing unit of the first radar system, the first beat signal by matching the sweep profile of the second FMCW radar signal with the sweep profile of the first FMCW radar signal. The method comprises deskewing, by the second deskewing unit of the second radar system, the second beat signal by matching the sweep profile of the first FMCW radar signal with the sweep profile of the second FMCW radar signal.

It is clear to a person skilled in the art that the statements set forth herein under use of hardware circuits, software means or a combination thereof may be implemented. The software means can be related to programmed microprocessors or a general computer, an ASIC (Application Specific Integrated Circuit) and/or DSPs (Digital Signal Processors). For example, the processing unit, the ADC, the controller, the wired interface, the deskewing unit, the signal generator and/or the transceiver may be implemented partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP. It is further clear to the person skilled in the art that even if the herein-described details will be described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above have been described in reference to the methods, these aspects may also apply to the radar system or the system. Likewise, the aspects described above in relation to the radar system and system may be applicable in a corresponding manner to the methods.

It is also to be understood that the terms used herein are for purpose of describing individual embodiments and are not intended to be limiting. Unless otherwise defined, all technical and scientific terms used herein have the meaning which corresponds to the general understanding of the skilled person in the relevant technical field of the present disclosure; they are to be understood too neither too broad nor too narrow. If technical terms are used incorrectly in the present disclosure, and thus do not reflect the technical concept of the present disclosure, these should be replaced by technical terms which convey a correct understanding to the skilled person in the relevant technical field of the present disclosure. The general terms used herein are to be construed based on the definition in the lexicon or the context. A too narrow interpretation should be avoided.

It is to be understood that terms such as, e.g., "comprising" "including" or "having" etc. mean the presence of the described features, numbers, operations, acts, components, parts, or combinations thereof, and do not exclude the presence or possible addition of one or more further features, numbers, operations, acts, components, parts or their combinations.

Although terms like "first" or "second", etc., may be used to describe different components or features, these components or features are not to be limited to these terms. With the above terms, only one component is to be distinguished from the other. For example, a first component may be referred to as a second component without departing from the scope of the present disclosure; and a second component may also be referred to as a first component. The term "and/or" includes both combinations of the plurality of related features, as well as any feature of that plurality of the described plurality of features.

In the present case, if a component is "connected to", "in communication with" or "accesses" another component, this may mean that it is directly connected to or directly accesses the other component; however, it should be noted that another component may be therebetween. If, on the other hand, a component is "directly connected" to another component or "directly accesses" the other component, it is to be understood that no further components are present therebetween.

In the following, the preferred embodiments of the present disclosure will be described with reference to the accompanying drawings; the same components are always provided with the same reference symbols.

In the description of the present disclosure, detailed explanations of known connected functions or constructions are omitted, insofar as they are unnecessarily distracting from the present disclosure; such functions and constructions are, however, understandable to the skilled person in the technical field of the present disclosure. The accompanying drawings are illustrative of the present disclosure and are not to be construed as a limitation. The technical idea of the present disclosure is to be construed as comprising, in addition to the accompanying drawings, all such modifications, variations and variants.

BRIEF DESCRIPTION OF THE DRAWINGS

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

DETAILED DESCRIPTION OF THE PREFERRED EMBODIMENTS

The variants of the functional and operational aspects as well as their functional and operational aspects described herein are only for a better understanding of its structure, its functions and properties; they do not limit the disclosure to the embodiments. The figures are partially schematic, said essential properties and effects are clearly shown enlarged or scaled down in part to clarify the functions, active principles, embodiments and technical characteristics. Every operation, every principle, every technical aspect and every feature that/which is disclosed in the figures or in the text is/can be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit the disclosure and therefore the possible combinations of all identified characteristics among themselves. All features disclosed are explicitly also individually and in combination with all other features disclosed herein.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The radar system, the system and the methods will now be described with respect to the embodiments.

In the following, without being restricted thereto, specific details are set forth to provide a thorough understanding of the present disclosure. However, it is clear to the skilled person that the present disclosure may be used in other embodiments, which may differ from the details set out below.

Figure 1:
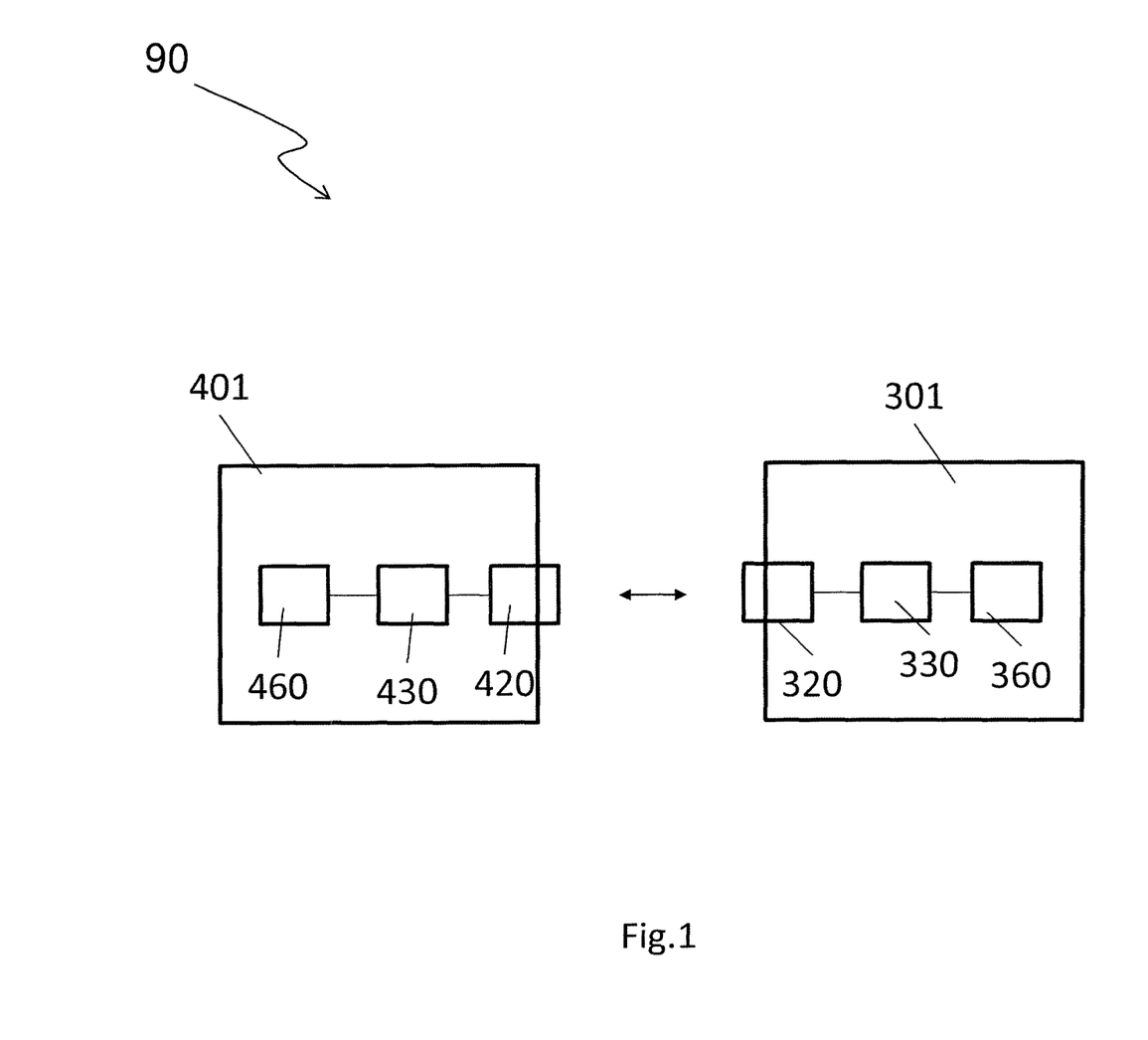
FIG. 1 schematically illustrates a system with a radar system for determining a distance between radar systems.

FIG. 1 schematically illustrates a radar system (401) for determining a distance to another radar system (301). The radar system (401) comprises a transceiver (420). The transceiver (420) is adapted to transmit a first Frequency Modulated Continuous Wave, FMCW, radar signal. The first FMCW radar signal comprises a first sweep profile. The transceiver (420) is further adapted to receive a second FMCW radar signal. The second FMCW radar signal comprises a second sweep profile. The first sweep profile of the first FMCW radar signal differs from the second sweep profile of the second FMCW radar signal. The radar system (401) further comprises a mixer (430). The mixer (430) is adapted to generate a beat signal based on the first FMCW radar signal and the second FMCW radar signal. The radar system (401) further comprises a deskewing unit (460). The deskewing unit (460) is adapted to deskew the beat signal by matching the sweep profile of the first FMCW radar signal with the sweep profile of the second FMCW radar signal.

For example, the mixer (430) is adapted to generate a beat signal based on the first FMCW radar signal and the second FMCW radar signal by generating the beat signal between the first FMCW radar signal and the second FMCW radar signal. The beat signal may be generated by demodulating the second FMCW radar signal under use of the first FMCW radar signal.

For example, the radar system (401) comprises a signal generator (410) adapted to generate the first FMCW radar signal. The signal generator (410) may be adapted to provide the generated first FMCW radar signal to the transceiver (420) and the mixer (430).

The provision of the first FMCW radar signal may be performed simultaneously. The provision of the FMCW radar signal may be performed on separate signal lines to the transceiver (420) and the mixer (430).

For example, the sweep profile of the first FMCW radar signal is linear. For example, the sweep profile of the second FMCW radar signal is linear. Further, the sweep profile of the first FMCW radar signal may have a triangular shape. For example, the sweep profile of the second FMCW radar signal has a triangular shape. Further, the sweep profile of the first FMCW radar signal may have a different time offset than the sweep profile of the second FMCW radar signal. Further, the sweep profile of the first FMCW radar signal may have a different frequency offset than the sweep profile of the second FMCW radar signal.

The triangular shape may have the advantage that a difference frequency may be easily distinguished from a Doppler frequency.

The sweep profile of the first FMCW radar signal may vary from pulse to pulse. The sweep profile of the second FMCW radar signal may vary from pulse to pulse.

This may provide for a better spoofing resiliency/robustness.

The sweep profile of the first FMCW radar signal may vary from measurement slot to measurement slot. The sweep profile of the second FMCW radar signal may vary from measurement slot to measurement slot.

The mixer (430) may be arranged downstream to the transceiver (420). The mixer (430) may be arranged downstream to the signal generator (410).

The signal generator (410) may be arranged upstream of the transceiver (420). The signal generator (410) may be arranged upstream to the mixer (430).

For example, the radar system (401) may comprise an analog-to-digital converter, ADC, (440). The ADC (440) may be arranged downstream the mixer (430). The ADC (440) may be adapted to digitize the beat signal. The step of deskewing may be performed on the digitized beat signal.

The radar system (401) may further comprise a controller (450). The controller (450) may be adapted to provide a first control signal to the signal generator (410). The first control signal may comprise information on characteristics of the first FMCW radar signals, such as sweep profile, time offset and/or frequency offset of the first FMCW radar signal.

The controller (450) may further be adapted to provide a second control signal to the ADC (440). The second control signal provides information on a change in a sampling rate to be used by the ADC (440).

The radar system (401) may further comprise a processing unit (470). The processing unit (470) may be adapted to determine a distance by processing the deskewed beat signal.

The step of determining the distance may be performed per measurement slot. The step of determining the distance may be performed per pulse.

The processing unit (470) may be arranged downstream to the deskewing unit (460). The controller (450) may be adapted to provide a third control signal to the processing unit (470). The processing unit (470) may be in communication with the controller (450). The controller (450) may be adapted to act as an interface for providing the determined distance from the processing unit (470) via the controller (450).

The radar system (401) may further comprise a wired data interface (480). The wired data interface (480) may be adapted to provide a local positioning system with information on the determined distance.

The wired data interface (480) may be in communication with the controller (450). The wired data interface (480) may be adapted to receive the determined distance. The wired data interface may be adapted to provide a command signal to the controller (450). The command signal may form a basis for the first control signal. The command signal may form a basis for the second control signal. The command signal may form a basis for the third control signal.

The radar system (401) may be monostatic.

The first and second FMCW radar signals may have different triangular sweep profiles.

The first FMCW radar signal may vary from pulse to pulse. The first FMCW radar signal may vary from a measurement slot to a next measurement slot.

FIG. 1 further schematically illustrates a system (90) for determining a distance between a first radar system (401) and a second radar system (301). The system (90) comprises the first radar system (401) and the second radar system (301). The first radar system (401) comprises a first transceiver (420), a first mixer (430) and a first deskewing unit (460). The system (90) comprises a second radar system (301). The second radar system (301) comprises a second transceiver (420), a second mixer (430) and a second deskewing unit (460). The first transceiver (420) is adapted to transmit a first Frequency Modulated Continuous Wave, FMCW, radar signal. The first FMCW radar signal comprises a first sweep profile. The second transceiver (320) is adapted to transmit a second FMCW radar signal. The second FMCW radar signal comprises a second sweep profile. The first and second sweep profiles are different. The first transceiver (420) is adapted to receive the second FMCW radar signal. The second transceiver (320) is adapted to receive the first FMCW radar signal. The first mixer (430) is adapted to generate a first beat signal based on the first FMCW radar signal and the second FMCW radar signal. The second mixer (330) is adapted to generate a second beat signal by demodulating the first FMCW radar signal under use of the second FMCW radar signal. The first deskewing unit (460) is adapted to deskew the first beat signal by matching the sweep profile of the second FMCW radar signal with the sweep profile of the first FMCW radar signal. The second deskewing unit (360) is adapted to deskew the second beat signal by matching the sweep profile of the first FMCW radar signal with the sweep profile of the second FMCW radar signal.

More details and aspects are mentioned in connection with the embodiments described above or below. The embodiment shown in FIG. 1 may comprise one or more optional additional features corresponding to one or more aspects mentioned in connection with the proposed concept or one or more embodiments described below (e.g., FIGS. 2-6).

Figure 2:
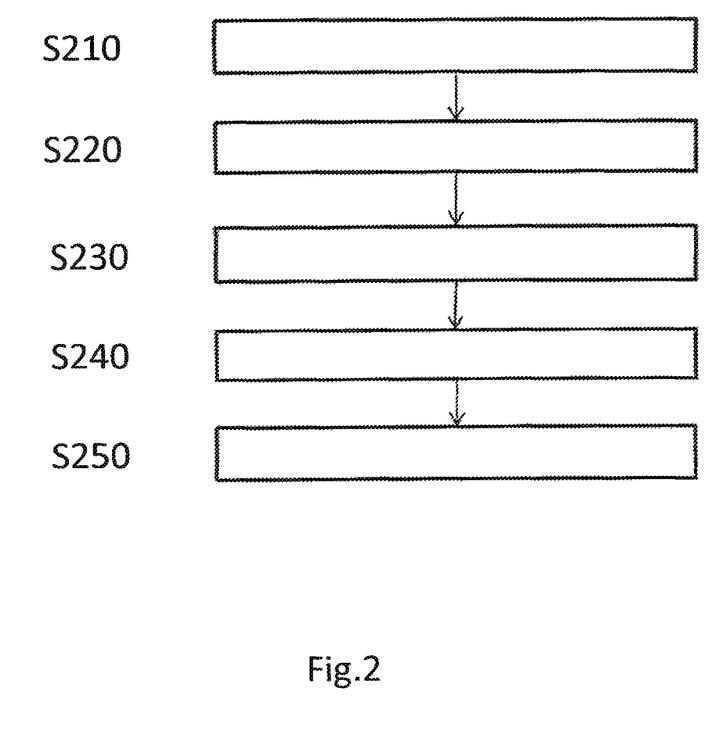
FIG. 2 schematically illustrates a method for determining a distance between radar systems.

FIG. 2 schematically illustrates a method for determining a distance between radar systems. The method comprises transmitting (S210), by a transceiver, a first Frequency Modulated Continuous Wave, FMCW, radar signal. The FMCW radar signal comprises a first sweep profile. The method further comprises receiving (S220), by the transceiver, a second FMCW radar signal. The second FMCW radar signal comprises a second sweep profile. The sweep profile of the first FMCW radar signal differs from a sweep profile of the second FMCW radar signal. The method further comprises generating (S230), by a mixer, a beat signal based on the first FMCW radar signal and the second FMCW radar signal. The method further comprises deskewing (S240), by a deskewing unit (460), the beat signal by matching the sweep profile of the first FMCW radar signal with the sweep profile of the second FMCW radar signal.

The beat signal may be generated under use of the first FMCW radar signal and the second FMCW radar signal.

For example, the step of deskewing may further comprise adjusting a frequency hub of the beat signal according to the sweep profile of the first FMCW radar signal. For example, the step of deskewing may further comprise adjusting a time offset of the beat signal according to the sweep profile of the first FMCW radar signal. For example, the step of deskewing may further comprise adjusting a frequency offset of the beat signal according to the sweep profile of the first FMCW radar signal. For example, the step of deskewing may further comprise adjusting a ramp profile of the beat signal according to the sweep profile of the first FMCW radar signal.

FIG. 2 further schematically illustrates a method for determining a distance between a first radar system and a second radar system. The method comprises transmitting (S210), by a first transceiver of the first radar system, a first Frequency Modulated Continuous Wave, FMCW, radar signal. The first FMCW radar signal comprises a first sweep profile. The method comprises transmitting (S215), by a second transceiver of the second radar system, a second FMCW radar signal. The second FMCW radar signal comprises a second sweep profile. The first and second sweep profiles are different. The method comprises receiving (S220), by the first transceiver of the first radar system, the second FMCW radar signal. The method comprises receiving (S225), by the second transceiver of the second radar system, the first FMCW radar signal. The method comprises generating (230), by a first mixer of the first radar system, a first beat signal based on the first FMCW radar signal and the second FMCW radar signal. The method comprises generating (S235), by a second mixer of the second radar system, a second beat signal by demodulating the first FMCW radar signal under use of the second FMCW radar signal. The method comprises deskewing (S240), by a first deskewing unit (460) of the first radar system, the first beat signal by matching the sweep profile of the second FMCW radar signal with the sweep profile of the first FMCW radar signal. The method comprises deskewing (S245), by the second deskewing unit of the second radar system, the second beat signal by matching the sweep profile of the first FMCW radar signal with the sweep profile of the second FMCW radar signal.

More details and aspects are mentioned in connection with the embodiments described above or below. The embodiment shown in FIG. 2 may comprise one or more optional additional features corresponding to one or more aspects mentioned in connection with the proposed concept or one or more embodiments described above (e.g., FIG. 1) or below (e.g., FIGS. 3-6).

Figure 3:
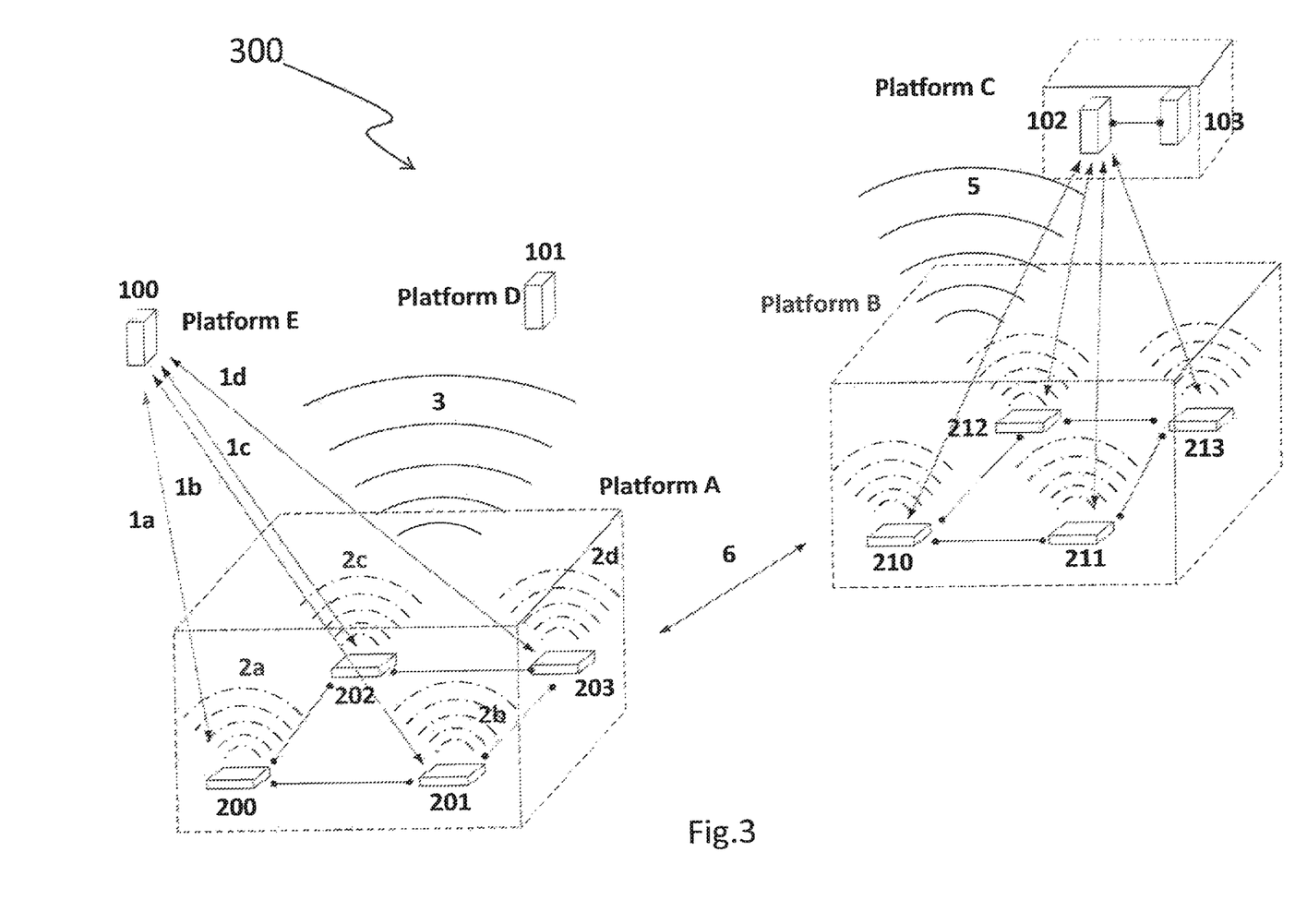
FIG. 3 schematically illustrates multiple radar networks for synchronization.

FIG. 3 schematically illustrates multiple radar networks for synchronization. A first radar network is positioned on a platform A. A second radar network is positioned on a platform B. Further, mobile units 100, 101, 102 and 103 are shown. The mobile unit 100 is mounted on a platform E. The mobile unit 101 is mounted on a platform D. The mobile units 102 and 103 are connected to each other and mounted on a platform C. The first radar network comprises a first plurality of radio beacons 200, 201, 202 and 203 mounted or fixed on mobile platform A (any number of radio beacons is imaginable). Radio beacons may also be referred herein as beacons or beacon units. The second radar network comprises a second plurality of radio beacons 210, 211, 212 and 213 mounted or fixed on mobile platform B.

In the scenario of FIG. 3, there may also be more platforms as shown herein. Each mobile platform may contain any number of client units that can be connected in a network. In this figure, there are shown different signals. The signals 3 and 5 are respective heartbeat (data) signals coming from the respective platforms A and B. The heartbeat (data) signals may be broadcasted from one or more beacon units of the respective first or second radar network.

The broadcasting may be performed in any combination of sequential and/or simultaneous transmit mode. Further, the signals 1a, 1b, 1c and 1d are ranging signals between a client and beacons (for example between platform E with client 100 and a respective beacon 202). Further, the signals 2a, 2b, 2c and 2d are ranging and data signals that can be picked up by any other passive clients like number 101 on platform D. The ranging and data signals may allow the client(s) to compute its (their) position. Further, signal 6 is either a passive or handshake negotiation in order to adjust each radar system to non-conflicting time-frequency slots (portions) operations. Further, a wired interface can run through units (may connect any unit within one platform) in any topology in order to exchange data or synchronization. For example, the beacon units of each platform A and B may be connected by wire. Any unit of the radar network may therefore exchange data or ranging/syncing signals to another unit either through the wireless interface or wired interface. Thus, it can be ensured that if a unit is completely shadowed in radio frequency (RF) terms, that it can still be incorporated into the respective radar network's time-frequency slots using a wired interface.

More details and aspects are mentioned in connection with the embodiments described above or below. The embodiment shown in FIG. 3 may comprise one or more optional additional features corresponding to one or more aspects mentioned in connection with the proposed concept or one or more embodiments described above (e.g., FIGS. 1-2) or below (e.g., FIGS. 4-6).

Figure 4:
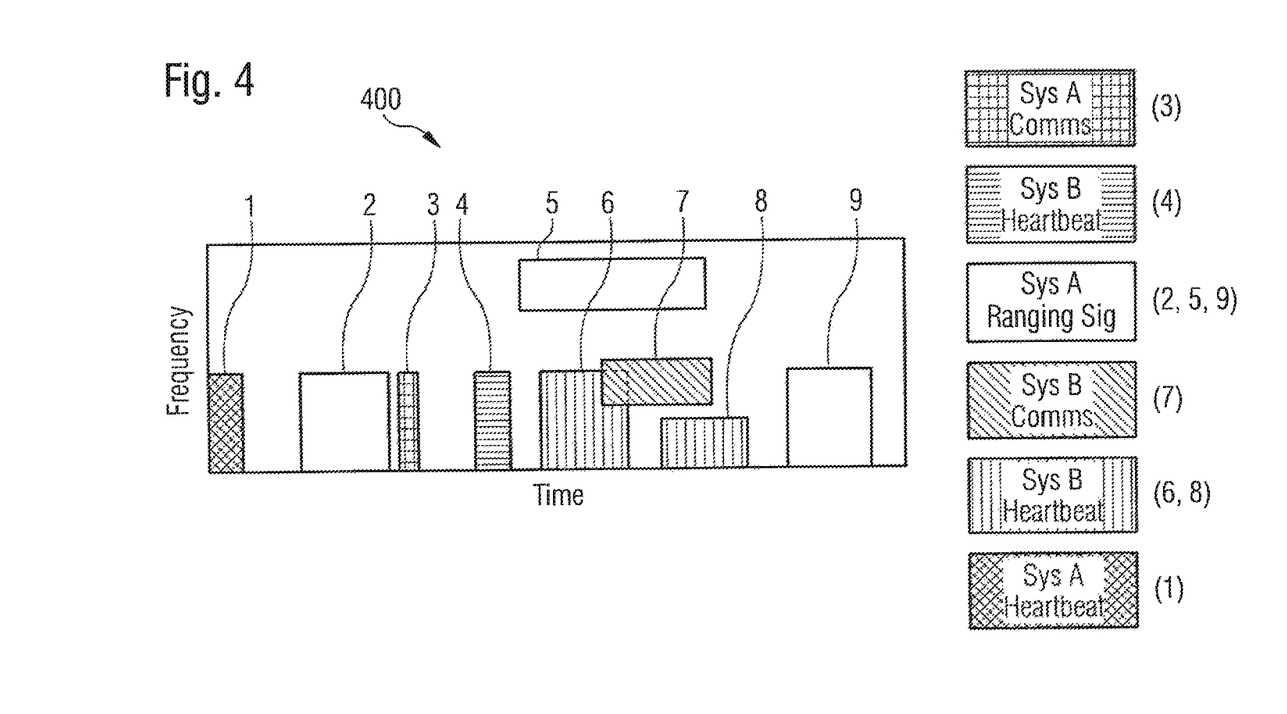
FIG. 4 schematically illustrates an allotment of a predetermined time-frequency space.

FIG. 4 schematically illustrates an allotment of a predetermined time-frequency space. Six different kinds of signals are shown in FIG. 4, however not restricted to six different kinds. The signals are referred to a respective platform A or B of FIG. 3. Thus, there are three different signals corresponding to platform A (Sys A Comms, Sys A Ranging Sig and Sys A Heartbeat) and three different signals corresponding to platform B (Sys B Heartbeat, Sys B Comms and Sys B Ranging). Sys A Comms (reference sign 3) and Sys B Comms (reference sign 7) are communication signals from the respective platforms A/B. Sys A Heartbeat (reference sign 1) and Sys B Heartbeat (reference sign 4) are heartbeat signals from the respective platforms A/B. Sys A Ranging Sig (reference signs 2, 5 and 9) and Sys B Ranging Sig (reference signs 6 and 8) are ranging signals from the respective platforms. Those signals may be allotted due to a synchronization phase and occupation intention of a respective radar network. Due to the radar networks' intentions to occupy a specific part of the time-frequency space such as in FIG. 4 shown, the different radar networks can be synchronized. Further, priorities may be handled due to a negotiation phase during allotment of the time-frequency space.

More details and aspects are mentioned in connection with the embodiments described above or below. The embodiment shown in FIG. 4 may comprise one or more optional additional features corresponding to one or more aspects mentioned in connection with the proposed concept or one or more embodiments described above (e.g., FIGS. 1-3) or below (e.g., FIGS. 5-6).

Figure 5:
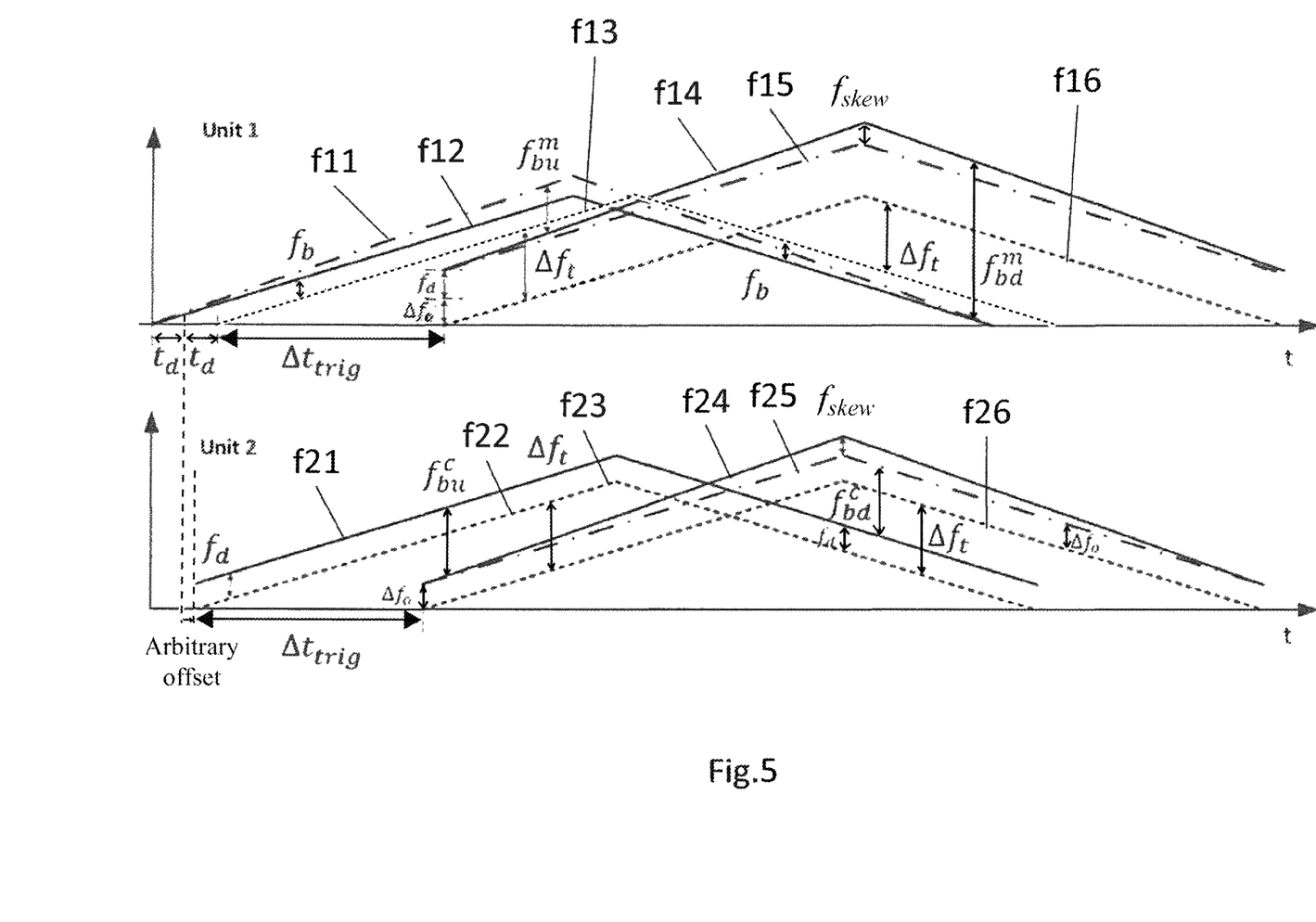
FIG. 5 schematically illustrates mismatched FMCW radar signals.

FIG. 5 schematically illustrates mismatched FMCW radar signals. A linear system of equations result in correction formulas. The respective parameters and variables are shown similar to a standard FMCW radar. Hereinafter, master may also refer to a beacon unit of a respective radar network, such as in FIG. 3. The same applies for the term "client", which may be a mobile unit separate from one of the platforms A or B, such as in FIG. 3. The following correction equations are used for correcting the artificial delays, the RF center frequency offset between transceivers and Doppler shift (and clock frequency offset correction):

$f_{bu,d}^{m,c}$ = beat frequency of the detected peak at master($m$)

or client($c$) during upsweep($u$) or downsweep($d$);

$f_{cNominal}$ = the nominal RF center frequency;

$t_m, B, c$ == sweep duration, RF bandwidth, speed of light;

$f_{b,range} = \dfrac{(f_{bu}^m - f_{bu}^c) + (f_{bd}^m - f_{bd}^c)}{2}$ = effective beat frequency of the range separation between master and client;

$\Delta f_o = \dfrac{1}{4}[(f_{bd}^m - f_{bu}^m) + (f_{bd}^c - f_{bu}^c)]$ = the difference in frequency between the client's and master's RF oscillator;

$f_d = \dfrac{1}{4}[(f_{bd}^m - f_{bu}^m) - (f_{bd}^c - f_{bu}^c)]$ = the Doppler shift;

range =

$\dfrac{ct_m}{2B} f_{b,range}$ = the distance in meters between master and client;

and velocity =

$f_d \dfrac{c}{f_{cNominal}}$ = the relative radial velocity between master and client.

Further, an additional correction is implemented to correct the range dependent frequency offset in a deskewing step (see graph fskew).

More details and aspects are mentioned in connection with the embodiments described above or below. The embodiment shown in FIG. 5 may comprise one or more optional additional features corresponding to one or more aspects mentioned in connection with the proposed concept or one or more embodiments described above (e.g., FIGS. 1-4) or below (e.g., FIG. 6).

Figure 6:
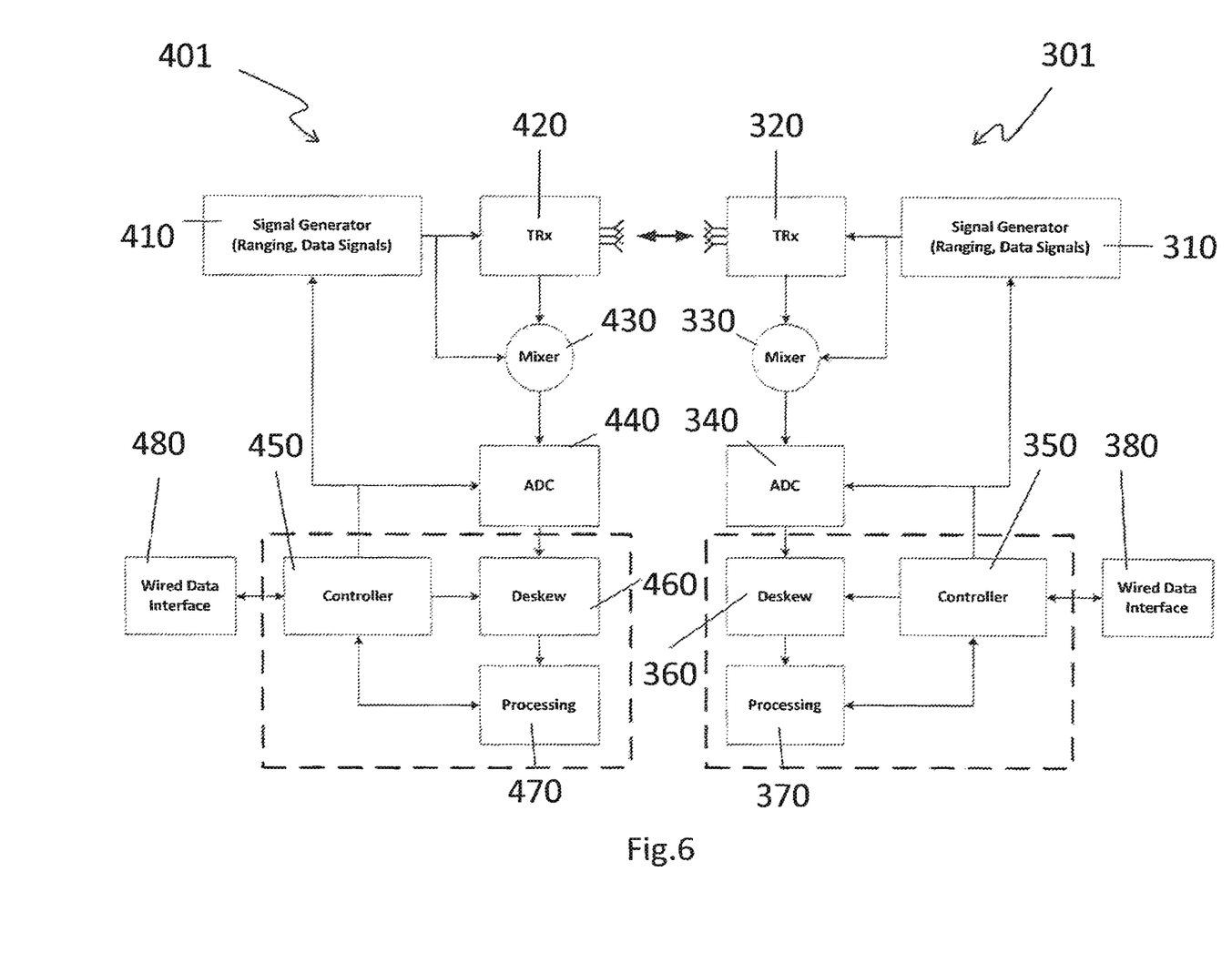
FIG. 6 schematically illustrates a block diagram of two radar units for distance measurement between each other.

FIG. 6 schematically illustrates a block diagram of two radar units 401 and 301 for distance measurement between each other. Specifically, both transceivers may be adapted to transmit data and ranging signals and not only ranging signals. FIG. 6 shows a first radar unit 401. The first radar unit may comprise a transceiver 420 (TRx) which may be adapted to transmit and receive signals from the second radar unit. More specifically, the transceiver 420 may be adapted to transmit data (via data link) and ranging signals. The first radar unit 401 further comprises a signal generator 410. The signal generator can be adapted to generate both ranging and data signals. Further the signal generator 410 may be adapted to feed the transceiver 420 with the (generated) data and ranging signals. The first radar unit 401 may further comprise a mixer 430. The mixer 430 may be adapted to downconvert a received signal into a baseband signal of interest by use of the signal fed by the signal generator 410 to the transceiver 420, which is also fed to the mixer 430 in order to downconvert the respectively received signal by the transceiver 420. Further, the first radar unit 401 may comprise an analog-to-digital converter 440 (ADC) which is adapted to perform conversion of the received signal in the digital domain. Further, the first radar unit may comprise a controller 450. The controller 450 may be adapted to feed the ADC 440 and the signal generator 410 with respective control signals in order to perform their respective tasks. Further, the first radar unit 401 may comprise a deskewing unit 460 (Deskew). The deskewing unit 460 may be adapted to perform the additional step of deskewing, such that a range dependent frequency offset can be eliminated. The deskewing unit 460 may be fed by control signals of the controller 450 as well as the signal generator 410 and the transceiver 420. Further, the first radar unit 401 may comprise a processing unit 470. The processing unit 470 may be fed by the deskewing unit 460 and may be in communication with the controller 450. Further, the first radar unit 401 may comprise a wired data interface 480. The wired data interface 480 may be in communication with the controller 450. The controller 450 may be programmable via the wired data interface in order to perform the respective tasks and to provide respective control signals to the respective units. Further, the wired data interface 480 may be used to send data (from any of the block units) to a network of other units in the same platform (airborne or ground). The block units may not necessarily be discrete elements, but show just logical operations and control.

FIG. 6 shows a second radar unit 301. The second radar unit may comprise a transceiver 320 (TRx) which may be adapted to transmit and receive signals from the second radar unit. More specifically, the transceiver 320 may be adapted to transmit data (via data link) and ranging signals. The second radar unit 301 further comprises a signal generator 310. The signal generator can be adapted to generate both ranging and data signals. Further the signal generator 310 may be adapted to feed the transceiver 320 with the (generated) data and ranging signals. The second radar unit 301 may further comprise a mixer 330. The mixer 330 may be adapted to downconvert a received signal into a baseband signal of interest by use of the signal fed by the signal generator 310 to the transceiver 320, which is also fed to the mixer 330 in order to downconvert the respectively received signal by the transceiver 320. Further, the second radar unit 301 may comprise an analog-to-digital converter 340 (ADC) which is adapted to perform conversion of the received signal in the digital domain. Further, the second radar unit may comprise a controller 350. The controller 350 may be adapted to feed the ADC 340 and the signal generator 310 with respective control signals in order to perform their respective tasks. Further, the second radar unit 301 may comprise a deskewing unit 360 (Deskew). The deskewing unit 360 may be adapted to perform the additional step of deskewing, such that a range dependent frequency offset can be eliminated. The deskewing unit 360 may be fed by control signals of the controller 350 as well as the signal generator 310 and the transceiver 320. Further, the second radar unit 301 may comprise a processing unit 370. The processing unit 370 may be fed by the deskewing unit 360 and may be in communication with the controller 350. Further, the second radar unit 301 may comprise a wired data interface 380. The wired data interface 380 may be in communication with the controller 350. The controller 350 may be programmable via the wired data interface in order to perform the respective tasks and to provide respective control signals to the respective units. Further, the wired data interface 380 may be used to send data (from any of the block units) to a network of other units in the same platform (airborne or ground). The block units may not necessarily be discrete elements, but show just logical operations and control.

More details and aspects are mentioned in connection with the embodiments described above or below. The embodiment shown in FIG. 6 may comprise one or more optional additional features corresponding to one or more aspects mentioned in connection with the proposed concept or one or more embodiments described above (e.g., FIGS. 1-5) or below.

Aspects may relate to Radar, Cooperative Radar, Two-way Ranging, Local Positioning System and Distance Measurement Devices.

Further aspects may relate to Manned or Unmanned Aerial Vehicle Landing System, Drone-Ship Landing System, Automotive or Aircraft Localization and Navigation, Indoor Localization, Gesture and Movement Tracking for Gaming or Augmented Reality, Robotics Control and Aircraft Formation Flying.

Aspects may relate to synchronized radar networks. For example, one or more ad hoc systems of radar networks are provided. The ad hoc systems may provide spatial/position information to any number of mobile units in a coverage area. The mobile units may be equipped with either receive mode only or cooperative mode Tx-Rx enabled RF front-ends. For example, each radar network transmits or broadcasts from one or more of its beacons a heartbeat/sync signal encoded with data information through a wired or wireless interface. Further, each radar network can contain one or more units capable of communicating with any unit in the same network either wired or wireless. Further, the repetition rate and time offset of the heartbeat signal can be arbitrary and adjusted to fit other heartbeat signals from neighboring systems in order to avoid collision of measurement and communication signals either in time or frequency domain. Further, each radar network may listen to the surrounding heartbeat signals and overall RF environment if a time-frequency space is occupied. Further, each radar network may broadcast its intention to occupy at least part of the time-frequency space. Further, each radar network may proceed to occupy the at least part of the time-frequency space when no conflicting intention is detected. Further, each radar network may then use its negotiated time-frequency space to put its measurement and communication signals to service. Specifically, to service its mobile clients with spatial and movement information (of the servicing radar network) as well as user data. Further, the radar network may align its heartbeat signals to be GPS trained. Further, priorities in the negotiation phase of time-frequency allotment can be put into a rule, e.g., Emergency service like coast guard can enable higher priority codes. The higher the priority the higher may be a probability of being readily provided with (the requested at least part of the) time-frequency space and a high update rate. The lowest order priority may be more probable to be settled in the lowest update rate possible for minimum working operational condition.

Aspects may relate to a mismatched FMCW radar signal and use thereof. For example, at least two nodes may measure their distance to each other using mismatched frequency modulated radar signals in time offset, frequency offset, and/or sweep profile. The nodes may also be referred to as radar sensors. Radar Sensors may also be referred to as radar units. The sweep profiles can be linear ramps of different slopes. For example, each node may deskew a beat signal of the FMCW radar signal (sent by the respective other node), i.e., after the mixer, in order to match the incoming ramp profile. An extra correction on the normal distance computation may be added due to some range dependent frequency offset. The ramp mismatch can be different from pulse to pulse. The ramp mismatch can be different from measurement slot to measurement slot. This may provide some spoofing resiliency.

Aspects may relate to a device to do distance measurement to another device and as a radar backscatter sensor under one single measurement time slot. For example, two or more transceivers may send their wideband signals (e.g., chirp, ofdm, etc.) at separate time or frequency offset within the measurement slot. The term transceiver may be referred to the device for transceiving signals which may comprise a transceiver unit. Further, each transceiver may process an equivalent time or frequency deviation of its transmitted signal to the incoming signal (of the other transceiver(s)). For example, at least one, in any pair of two transceivers, may send the corresponding deviation to the other through a data link using the same transceiver unit. The transceiver may receive the deviation data and may compute the equivalent separation distance (between the two transceivers) by incorporating its own corresponding measurement of the time or frequency deviation. Independent of measuring the time or frequency deviation from the other transceiver(s) which is (are) mapped at certain time or frequency region(s) with enough offset away from the backscatter region of any transceiver(s), any transceiver may compute the backscatter region by sensing the environment using normal radar techniques. For example, the transceiver may be used as proximity sensor or as collision avoidance sensor.

Most of available systems for localization, such as radar systems, may suffer from interference by another radar system of a same type, when operated side by side. They may be pre-planned and manually configured in order to work properly together. This may be disadvantageous in highly mobile systems such as ships or formation flying where radar systems can encounter and disrupt each other in the field. Thus, there may be a demand to provide concepts for operating local positioning systems of a same type ad hoc side by side.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The present disclosure is not limited in any way to the embodiments described above. On the contrary, there are many possibilities for modifications thereof, which are apparent to an average skilled person without departing from the underlying idea of the present disclosure as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A radar system for determining a distance to another radar system, the radar system comprising:

a transceiver adapted to transmit a first Frequency Modulated Continuous Wave (FMCW) radar signal, which comprises a first sweep profile, wherein the transceiver is further adapted to receive a second FMCW radar signal from another radar system, which comprises a second sweep profile, and wherein the first sweep profile of the first FMCW radar signal differs from the second sweep profile of the second FMCW radar signal;
a mixer adapted to generate a beat signal based on the first FMCW radar signal and the second FMCW radar signal;
an analog-to-digital converter (ADC), wherein the ADC is arranged downstream of the mixer and adapted to digitize the beat signal;
a deskewing unit adapted to deskew the digitized beat signal by matching the sweep profile of the first FMCW radar signal with the sweep profile of the second FMCW radar signal; and,
a processing unit, which is adapted to determine the distance to the other radar system by processing the deskewed beat signal.

2. The radar system according to claim 1, further comprising a signal generator adapted to generate the first FMCW radar signal and to provide a generated first FMCW radar signal to the transceiver and the mixer.

3. The radar system according to claim 2, wherein the mixer is arranged downstream of the transceiver and wherein the mixer is arranged downstream of the signal generator.

4. The radar system according to claim 2, further comprising a controller adapted to provide a first control signal to the signal generator, which first control signal comprises information on characteristics of the first FMCW radar signals.

5. The radar system according to claim 4, wherein the characteristics of the first FMCW radar signals comprise at least one of sweep profile, time offset, or frequency offset of the first FMCW radar signal.

6. The radar system according to claim 4, wherein the controller is further adapted to provide a second control signal to the ADC, which second control signal provides information on a change in a sampling rate to be used by the ADC.

7. The radar system according to claim 6, wherein the processing unit is arranged downstream to the deskewing unit and wherein the controller is adapted to provide a third control signal to the processing unit, which is in communication with the controller, wherein the controller is adapted to act as an interface for providing the determined distance from the processing unit via the controller.

8. The radar system according to claim 4, further comprising a wired data interface adapted to provide a local positioning system with information on the determined distance.

9. The radar system according to claim 8, wherein the wired data interface is in communication with the controller and is adapted to receive the determined distance and to provide a command signal to the controller, wherein the command signal forms a basis for the first, second and third control signals.

10. The radar system according to claim 1, wherein the radar system is monostatic.

11. The radar system according to claim 1, wherein the first and second FMCW radar signals have different triangular sweep profiles.

12. The radar system according to claim 1, wherein the first FMCW radar signal varies at least one of from pulse to pulse or from a measurement slot to a next measurement slot.

13. A method for determining a distance between radar systems, the method comprising:
transmitting, by a transceiver of a first radar system, a first Frequency Modulated Continuous Wave, FMCW, radar signal, which comprises a first sweep profile;
receiving, by the transceiver, a second FMCW radar signal from a second radar system, which comprises a second sweep profile, wherein the sweep profile of the first FMCW radar signal differs from the sweep profile of the second FMCW radar signal;
generating, by a mixer, a beat signal based on the first FMCW radar signal and the second FMCW radar signal;
digitizing, by an analog-to-digital converter (ADC) that is arranged downstream of the mixer, the beat signal;
deskewing, by a deskewing unit, the digitized beat signal by matching the sweep profile of the first FMCW radar signal with the sweep profile of the second FMCW radar signal; and,
determining, by a processing unit, the distance between the radar systems by processing the deskewed beat signal.

14. The method according to claim 13, wherein the step of deskewing comprises at least one of the following steps:
adjusting a time offset of the beat signal according to the sweep profile of the first FMCW radar signal;
adjusting a frequency offset of the beat signal according to the sweep profile of the first FMCW radar signal; or
adjusting a ramp profile of the beat signal according to the sweep profile of the first FMCW radar signal.

15. A system for determining a distance between a first radar system and a second radar system comprising:
the first radar system comprising a first transceiver, a first mixer, a first analog-to-digital converter (ADC), which is arranged downstream of the first mixer, and a first deskewing unit;
the second radar system comprises a second transceiver, a second mixer, a second analog-to-digital converter (ADC), which is arranged downstream of the second mixer, and a second deskewing unit; and,
a processing unit,
wherein the first transceiver is adapted to transmit a first Frequency Modulated Continuous Wave (FMCW) radar signal, which comprises a first sweep profile;
wherein the second transceiver is adapted to transmit a second FMCW radar signal, which comprises a second sweep profile, and wherein the first and second sweep profiles are different;
wherein the first transceiver is adapted to receive the second FMCW radar signal;
wherein the second transceiver is adapted to receive the first FMCW radar signal;
wherein the first mixer is adapted to generate a first beat signal based on the first FMCW radar signal and the second FMCW radar signal;
wherein the second mixer is adapted to generate a second beat signal by demodulating the first FMCW radar signal under use of the second FMCW radar signal;
wherein the first analog-to-digital converter (ADC) is adapted to digitize the first beat signal;
wherein the second analog-to-digital converter (ADC) is adapted to digitize the second beat signal wherein the first deskewing unit is adapted to deskew the first digitized beat signal by matching the sweep profile of the second FMCW radar signal with the sweep profile of the first FMCW radar signal;
wherein the second deskewing unit is adapted to deskew the second digitized beat signal by matching the sweep profile of the first FMCW radar signal with the sweep profile of the second FMCW radar signal; and
wherein the processing unit is adapted to determine the distance between the first radar system and the second radar system by processing the deskewed beat signals.

16. A method for determining a distance between a first radar system and a second radar system:
transmitting, by a first transceiver of the first radar system, a first Frequency Modulated Continuous Wave (FMCW) radar signal, which comprises a first sweep profile;
transmitting, by a second transceiver of the second radar system, a second FMCW radar signal, which comprises a second sweep profile, and wherein the first and second sweep profiles are different;
receiving, by the first transceiver of the first radar system, the second FMCW radar signal;
receiving, by the second transceiver of the second radar system, the first FMCW radar signal;
generating, by a first mixer of the first radar system, a first beat signal based on the first FMCW radar signal and the second FMCW radar signal;
generating, by a second mixer of the second radar system, a second beat signal by demodulating the first FMCW radar signal under use of the second FMCW radar signal;
digitizing, by a first analog-to-digital converter (ADC) that is arranged downstream of the first mixer, the first beat signal;
digitizing, by a second analog-to-digital converter (ADC) that is arranged downstream of the second mixer, the second beat signal;
deskewing, by a first deskewing unit of the first radar system, the first digitized beat signal by matching the sweep profile of the second FMCW radar signal with the sweep profile of the first FMCW radar signal;
deskewing, by a second deskewing unit of the second radar system, the second digitized beat signal by matching the sweep profile of the first FMCW radar signal with the sweep profile of the second FMCW radar signal; and
determining, by a processing unit, the distance between the first radar system and the second radar system by processing the deskewed beat signals.

* * * * *